US011738337B2

(12) United States Patent
Koser (10) Patent No.: US 11,738,337 B2
(45) Date of Patent: Aug. 29, 2023

(54) SYSTEMS, DEVICES AND METHODS FOR CARTRIDGE SECUREMENT (71) Applicant: Ancera Inc., Branford, CT (US)

(72) Inventor: Hur Koser, Wallingford, CT (US)

(73) Assignee: ANCERA INC., Branford, CT (US)

( * ) Notice: Subject to any disclaimer, the term of this patent is extended or adjusted under 35 U.S.C. 154(b) by 485 days.

(21) Appl. No.: 16/859,431

(22) Filed: Apr. 27, 2020

(65) Prior Publication Data
US 2020/0353466 A1 Nov. 12, 2020

Related U.S. Application Data (63) Continuation of application No. 15/660,606, filed on Jul. 26, 2017, now Pat. No. 10,632,463.
(Continued)

(51) Int. Cl.
B01L 3/00 (2006.01)
B03C 1/28 (2006.01)
(Continued)

(52) U.S. Cl.
CPC .... B01L 3/502707 (2013.01); B01D 19/0031 (2013.01); B01L 3/50273 (2013.01);
(Continued)

(58) Field of Classification Search
CPC ......... B01L 3/502707; B01L 3/502761; B01L 3/50273; B01L 3/502738; B01L 2300/0681; B01L 2400/043; B01L 2400/0487; B01L 2200/0652; B01L 2300/0627; B01L 2300/10; B01L 2400/0622; B01L 2400/082; G01N 15/1031; G01N 35/1097; G01N 15/1056; G01N 2015/0065; G01N 2015/1081; G01N 21/6452; G01N 2015/1006; B03C 1/288; B03C 1/0335; B03C 1/32; B03C 2201/26;
(Continued)

(56) References Cited

U.S. PATENT DOCUMENTS 5,439,586 A    8/1995  Richards et al.
6,045,755 A *  4/2000  Lebl ..................... B01J 19/0046
                                                        422/65
(Continued)

FOREIGN PATENT DOCUMENTS

CN    201125246 Y    10/2008

OTHER PUBLICATIONS

Non-Final Office Action dated Jan. 27, 2020 for U.S. Appl. No. 15/708,032, 10 pages.
(Continued)

Primary Examiner — Nathaniel T Woodward
(74) Attorney, Agent, or Firm — Cooley LLP (57) ABSTRACT In certain embodiments, the disclosure provides an inflatable bladder lid that configures with a cartridge configured for assay testing. The inflatable bladder provides substantially uniform pressure to the cartridge. The pressure is substantially distributed across the one or more regions of the cartridge to extend pressure over a wide cartridge surface. At least a portion of the bladder lid may comprise a flexible membrane material that inflates and stretches over at least a portion of the cartridge to conformally contact its first/top surface.

20 Claims, 10 Drawing Sheets

Related U.S. Application Data (60) Provisional application No. 62/369,151, filed on Jul. 31, 2016, provisional application No. 62/369,163, filed on Jul. 31, 2016.

(51) Int. Cl.

| | |
|---|---|
| *B03C 1/033* | (2006.01) |
| *G01N 15/10* | (2006.01) |
| *G01N 35/10* | (2006.01) |
| *B01D 19/00* | (2006.01) |
| *B03C 1/32* | (2006.01) |
| *B07B 1/46* | (2006.01) |
| *G01N 21/64* | (2006.01) |
| *G01N 15/00* | (2006.01) |

(52) U.S. Cl.
CPC ... *B01L 3/502738* (2013.01); *B01L 3/502761* (2013.01); *B03C 1/0335* (2013.01); *B03C 1/288* (2013.01); *B03C 1/32* (2013.01); *B07B 1/4636* (2013.01); *G01N 15/1031* (2013.01); *G01N 15/1056* (2013.01); *G01N 35/1097* (2013.01); *B01L 2200/0652* (2013.01); *B01L 2300/0627* (2013.01); *B01L 2300/0681* (2013.01); *B01L 2300/10* (2013.01); *B01L 2400/043* (2013.01); *B01L 2400/0487* (2013.01); *B01L 2400/0622* (2013.01); *B01L 2400/082* (2013.01); *B03C 2201/18* (2013.01); *B03C 2201/20* (2013.01); *B03C 2201/26* (2013.01); *G01N 21/6452* (2013.01); *G01N 2015/0065* (2013.01); *G01N 2015/1006* (2013.01); *G01N 2015/1081* (2013.01)

(58) Field of Classification Search
CPC ............ B03C 2201/18; B03C 2201/20; B01D 19/0031; B07B 1/4636
See application file for complete search history.

(56) References Cited

U.S. PATENT DOCUMENTS

| | | | | |
|---|---|---|---|---|
| 6,303,389 | B1 * | 10/2001 | Levin | G01N 33/54366 435/7.1 |
| 6,309,889 | B1 * | 10/2001 | Cutler | B01L 3/50853 435/297.5 |
| 10,632,463 | B2 | 4/2020 | Koser | |
| 2005/0199550 | A1 * | 9/2005 | Haney | B01D 63/08 210/450 |
| 2005/0233472 | A1 | 10/2005 | Kao et al. | |
| 2005/0237528 | A1 | 10/2005 | Oldham et al. | |
| 2005/0244932 | A1 | 11/2005 | Harding | |
| 2005/0280811 | A1 | 12/2005 | Sandell | |
| 2006/0011305 | A1 | 1/2006 | Sandell et al. | |
| 2006/0013984 | A1 | 1/2006 | Sandell et al. | |
| 2006/0024690 | A1 | 2/2006 | Kao et al. | |
| 2006/0024831 | A1 | 2/2006 | Kao et al. | |
| 2006/0029948 | A1 | 2/2006 | Lim et al. | |
| 2006/0188399 | A1 | 5/2006 | Gu et al. | |
| 2007/0014694 | A1 | 1/2007 | Beard et al. | |
| 2007/0015289 | A1 | 1/2007 | Kao et al. | |
| 2007/0224084 | A1 | 9/2007 | Holmes et al. | |
| 2008/0000892 | A1 * | 1/2008 | Hirano | G01N 21/6452 219/433 |
| 2008/0006202 | A1 | 1/2008 | Hirano et al. | |
| 2008/0210560 | A1 | 9/2008 | Barringer | |
| 2009/0165876 | A1 | 7/2009 | Atkin et al. | |
| 2009/0175797 | A1 | 7/2009 | Warren et al. | |
| 2009/0220932 | A1 | 9/2009 | Ingber et al. | |
| 2009/0251136 | A1 | 10/2009 | Prins et al. | |
| 2011/0212440 | A1 | 9/2011 | Viovy et al. | |
| 2012/0178645 | A1 | 7/2012 | Foekens et al. | |
| 2012/0190589 | A1 | 7/2012 | Anderson et al. | |
| 2012/0237997 | A1 | 9/2012 | Koser | |
| 2013/0189794 | A1 | 1/2013 | Emeric et al. | |
| 2013/0313113 | A1 | 11/2013 | Koser | |
| 2014/0044600 | A1 | 2/2014 | McAlister | |
| 2014/0283945 | A1 * | 9/2014 | Jones | A61J 1/20 422/546 |
| 2015/0041396 | A1 | 2/2015 | Kelly et al. | |
| 2016/0016171 | A1 | 1/2016 | Goel | |
| 2016/0188399 | A1 | 6/2016 | Benedict | |
| 2017/0122851 | A1 | 5/2017 | Thatcher et al. | |
| 2017/0297028 | A1 | 10/2017 | Jones et al. | |
| 2018/0029033 | A1 | 2/2018 | Koser | |
| 2018/0128671 | A1 | 5/2018 | Paur et al. | |
| 2018/0128729 | A1 | 5/2018 | Koser | |

OTHER PUBLICATIONS

Non-Final Office Action dated Jul. 12, 2019 for U.S. Appl. No. 15/660,616, 17 pages.
Final Office Action dated Jan. 17, 2020 for U.S. Appl. No. 15/660,616, 14 pages.
Non-Final Office Action dated Aug. 22, 2019 for U.S. Appl. No. 15/660,606, 10 pages.
International Search Report and Written Opinion dated Oct. 6, 2017 for International Application No. PCT/US2017/043985, 9 pages.

* cited by examiner

SYSTEMS, DEVICES AND METHODS FOR CARTRIDGE SECUREMENT

CROSS-REFERENCE TO RELATED APPLICATIONS

The present application is a continuation of U.S. patent application Ser. No. 15/660,606, filed Jul. 26, 2017, entitled "Systems, Devices and Methods for Cartridge Securement", (U.S. Pat. No. 10,632,463) which claims priority to U.S. Provisional Application Ser. No. 62/369,151, filed Jul. 31, 2016, and entitled "Systems, Devices and Methods for Cartridge Securement," and U.S. Provisional Application Ser. No. 62/369,163, filed Jul. 31, 2016, and entitled "Multilayer Disposable Cartridge for Ferrofluid-Based Assays and Method of Use." The disclosures of each
of these applications are incorporated herein by reference
in their entireties.

FIELD

The disclosure generally relates to systems, devices, and methods for cartridge securement, including ferrofluid-mediated assays, and systems that interface with cartridges that run such assays.

BACKGROUND

Conventional laboratory testing and measurement systems are comprised of at least two components: an instrument and a cartridge. The instrument provides power and excitation signals to perform a given assay and measures generated signals to ultimately quantify the result of the said assay. The cartridge can be inserted into the instrument and provides an interface between the instrument and the assay.

The cartridge is replaced and/or is disposed of at the end of each assay. A new cartridge may be inserted into the instrument at the beginning of the next assay. In most applications, the disposable cartridge is inserted into the instrument through an opening at the beginning of the new assay. This opening can be a door, a slot, or a compartment built into the instrument to receive the cartridge. In some assays, reagents flow within channels or inside the cartridge. The reagents transport biological and/or chemical moieties relevant to the assay from input reservoirs into different compartments within that cartridge. The fluid motion leads to pressure variations between different segments or channels of the cartridge. The fluid motion also leads to pressure differences between the inside of the cartridge and the ambient pressure. As such, cartridge walls are normally built so that they are thick enough to withstand and tolerate pressure differences between its channels and the ambient pressure.

However, in certain applications, the instrument generates an excitation energy (e.g., electromagnetic, acoustic, thermal, etc.) that needs to couple strongly to the cartridge channels and/or compartments. The coupling may require close proximity between the excitation source and the internals of the cartridge. In such cases, the cartridge wall that separates the cartridge channels from the excitation source of the instrument must be as thin as possible. The thin wall geometry is prone to inflation of cartridge flow channels and other features due to hydraulic flow pressure. This necessitates a proper clamping mechanism over the cartridge to prevent uncontrolled changes to fluidic dimensions during an assay run.

The conventional solution to this problem has been to include a mechanical instrument door (interchangeably, id) that closes over the cartridge. The mechanical lid provides support needed to prevent the cartridge channels from inflating or changing shape. This approach works relatively well when the disposable cartridge is relatively narrow (e.g., only a few centimeters wide), featuring a single set of channels at its center. When the cartridge features a multitude of parallel assays with multiple sets of channels spread over a relatively large width (e.g., over 4-5 cm wide), it becomes significantly more difficult to establish and maintain uniform back-pressure over the cartridge using the mechanical lid approach.

Figure 1A:
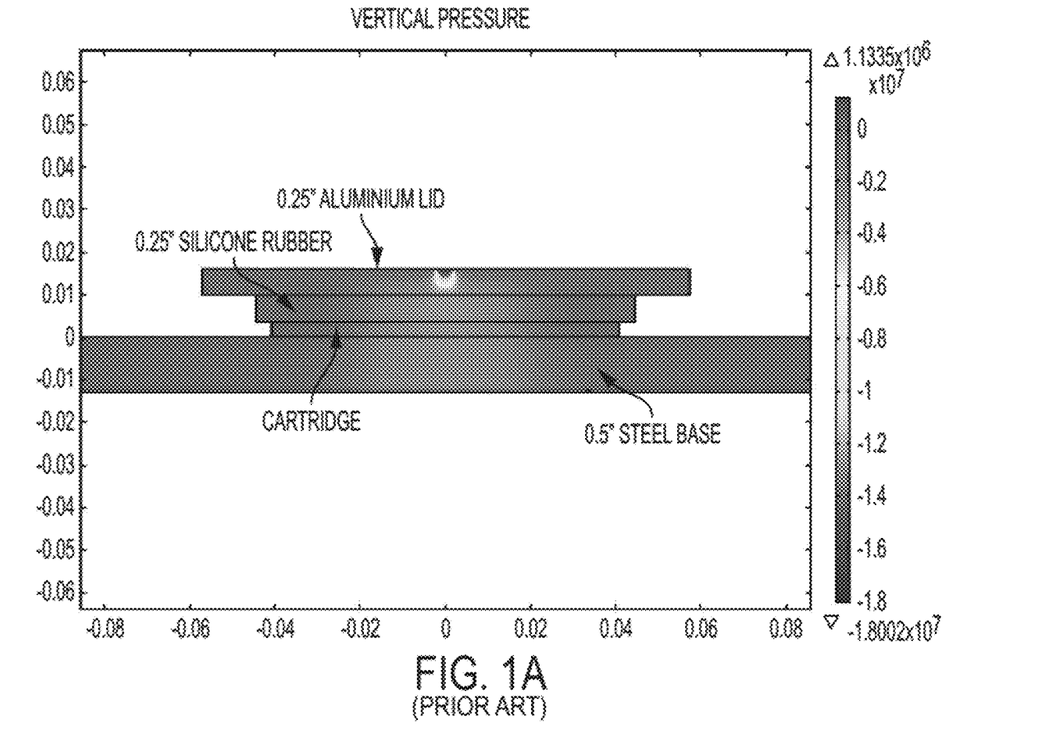
FIG. 1A is schematic representation of vertical pressure on a cartridge lid.

FIG. 1A schematically illustrates the vertical pressure on a conventional cartridge maintained under a mechanical lid. In FIG. 1A, stress simulation of a simple mechanical lid structure that uses quarter-inch thick plates of aluminum and silicone rubber, respectively, to press on a cartridge several millimeters thick. For simplicity, the bottom support is assumed to be thick steel which is constrained from moving. A narrow distribution of mechanical force (spread across approximately a one eighth inch (⅛ in.) distance) at the center top of the aluminum plate presses down on the sandwich structure. The simulated case roughly corresponds to a lid latch or an over-center clamp holding the applied force over the aluminum plate.

Figure 1B:
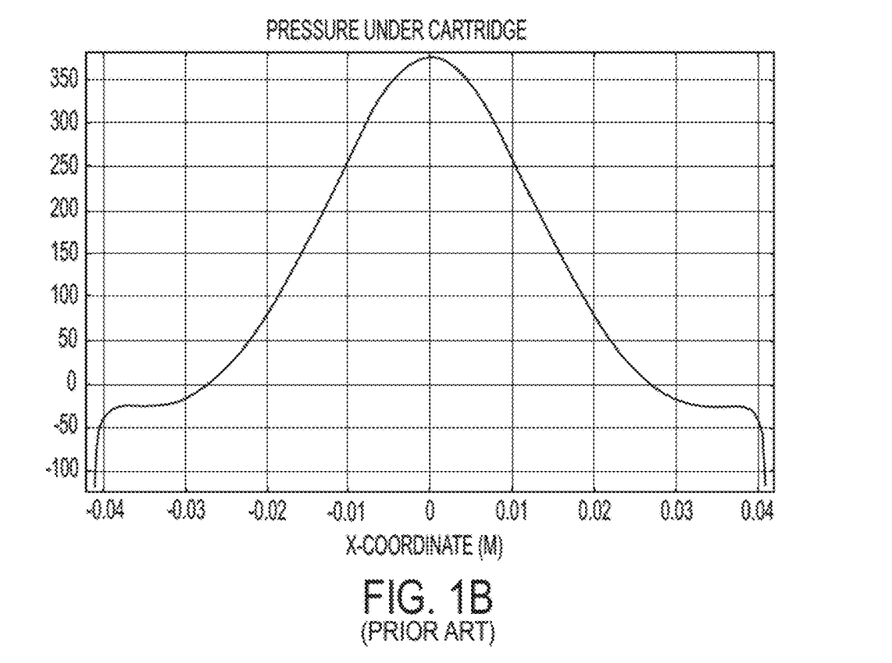
FIG. 1B is a graphical representation of pressure at various regions of the cartridge lid.

FIG. 1B graphically represents the pressure under the cartridge across its width. It should be noted that the pressure over the cartridge surface is highly non-uniform—peaking directly under the location of the applied force, and going negative near the edges. The negative pressure indicates that the aluminum-silicone lid is bending downward at the center and upward near the cartridge edges. This is highly undesirable.

The root cause of this shortcoming is the fact that the lid ends up being used to transform a mechanical force (often originating from a point or a small region, such as the hinges or latch of a door) into a uniform pressure over a wide cartridge surface. The wider the cartridge, the thicker, stiffer and heavier the mechanical door will need to be to supply acceptably uniform pressure over the entirety of the cartridge.

Accordingly, there is a need for a system, method, and apparatus to provide substantially uniform support over a cartridge lid configured to work with a measurement instrument.

DETAILED DESCRIPTION

In some embodiments, an inflatable bladder lid is disclosed that addresses at least some of the shortcomings of conventional mechanical lids in the securing of a cartridge. In such embodiments, pressure under the cartridge lid is uniformly dispersed instead of trying to convert a mechanical force vector into a uniform pressure exerted over a wide cartridge surface. To this end, the noted embodiments provide an inflatable bladder which is configured to inflate to a desired operating pressure over the cartridge. Accordingly, with such functionality, at least a portion of the bladder lid may comprise a flexible membrane material that inflates and stretches over at least a portion of the cartridge to conformally contact its first/top surface.

The bladder may be inflated and/or deflated using a small pressure regulator incorporated into the instrument, thereby allowing the bladder to be tuned to any desired or required pressure. In some embodiments, when the bladder is inflated to a moderate pressure (e.g., approximately 20 psi above ambient air pressure), the bladder makes contact over the surface area of the cartridge. The force retains the cartridge in place and prevents accidental dislocation. For instance, in some embodiments, if the total contact area is 5 square inches, the total clamping force on the cartridge will be about 100 pounds (for about 20 psi of bladder pressure).

Further, in some embodiments, the bladder requires no more than a fraction of an inch (e.g., a quarter inch (¼ in.)) thick aluminum plate (or a steel plate that is a third of that thickness) as its mechanical support. Hence, the total size (both volume and mass) of the bladder system is a very small fraction of what would be necessary if a mechanical door/clamp were to be used with similar performance requirements in pressure uniformity and repeatability.

In some embodiments, multiple bladders may be utilized to cover specific regions of the cartridge surface, where each bladder can be set independently to different pressures, depending on the needs of the application. For example, multiple bladders may be used to pressurize a respective region of the cartridge and to thereby control reagent movement.

Figure 2A:
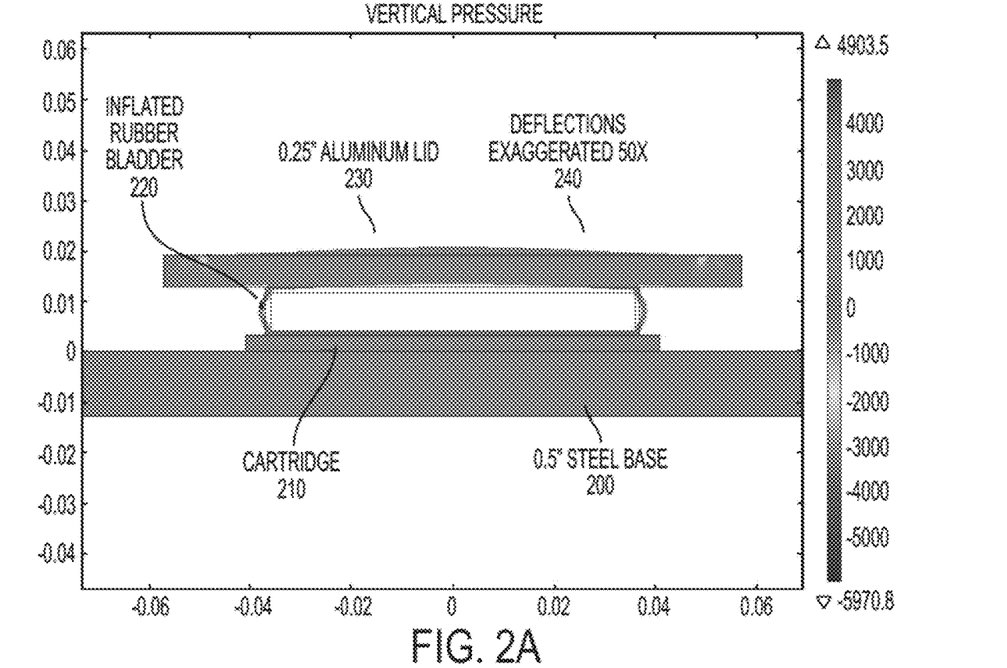
FIG. 2A is schematic representation of vertical pressure simulation on an exemplary cartridge lid according to some embodiments of the disclosure.

FIG. 2A shows a cartridge securing system according to some embodiments of the disclosure. Specifically, FIG. 2A shows base 200, cartridge 210, inflatable bladder 220, and aluminum lid 230. Base 200 may comprise, for example, 0.5" steel base or other similar material and cartridge 210 may comprise any conventional cartridge configured for assay testing. In some embodiments, cartridge 210 may include one or more action surfaces and/or reaction channels. Inflatable bladder 220 may comprise rubber or any material capable of conformaly expanding and contracting. The bladder deflection is shown (exaggerated by 50×) by arrow 240.

FIG. 2A also shows a stress simulation of an inflatable bladder lid that uses a quarter-inch thick plate of aluminum, for example, for support and a thin rubber bladder that inflates directly over the cartridge. For simplicity, the bottom support is illustrated to be thick steel that is constrained from moving. The inflated bladder applies uniform force over substantially the entire contact area (in some embodiments, over the entire contact area).

In some embodiments, the dimensions (e.g., width and/or length) of the bladder may be slightly larger than the corresponding dimensions of the cartridge area that requires constant pressure. To this end, bladder 220 may be simultaneously a vessel for pressure-containment and for pressure-transfer. In some embodiments, the total amount of pressure that it is designed to contain, together with the vertical distance between the cartridge and the bladder when it is deflated, determine the amount of stretching that the bladder membrane undergoes.

In some embodiments, the deflated distance between the bladder membrane and the top surface of the cartridge may be only several millimeters. With such close proximity to the cartridge, the amount of membrane stretching (when inflated) can be minimized, which greatly increases the type and variety of materials that can be used as a bladder membrane. For instance, the bladder membrane may be constructed from different types and grades of rubber. An exemplary embodiment includes neoprene rubber with a wide softness gauge range (e.g., between 30 A and 60 A). Another exemplary embodiment is silicone rubber with a similar softness gauge. Soft material, such as silicone or plastic, may be used for their ease of injection molding. Some soft plastics may offer other advantages including optical transparency/translucency, which may help in certain assays that rely on optical signals (e.g., bright-field, dark field, and fluorescence microscopy, flow cytometry, etc.). In such assays, part of the mechanical mount of the bladder may also be transparent (e.g., made of transparent plastic, such as plexiglass or polycarbonate, or made of glass) to allow light transmission through the entire bladder lid structure.

Figure 2B:
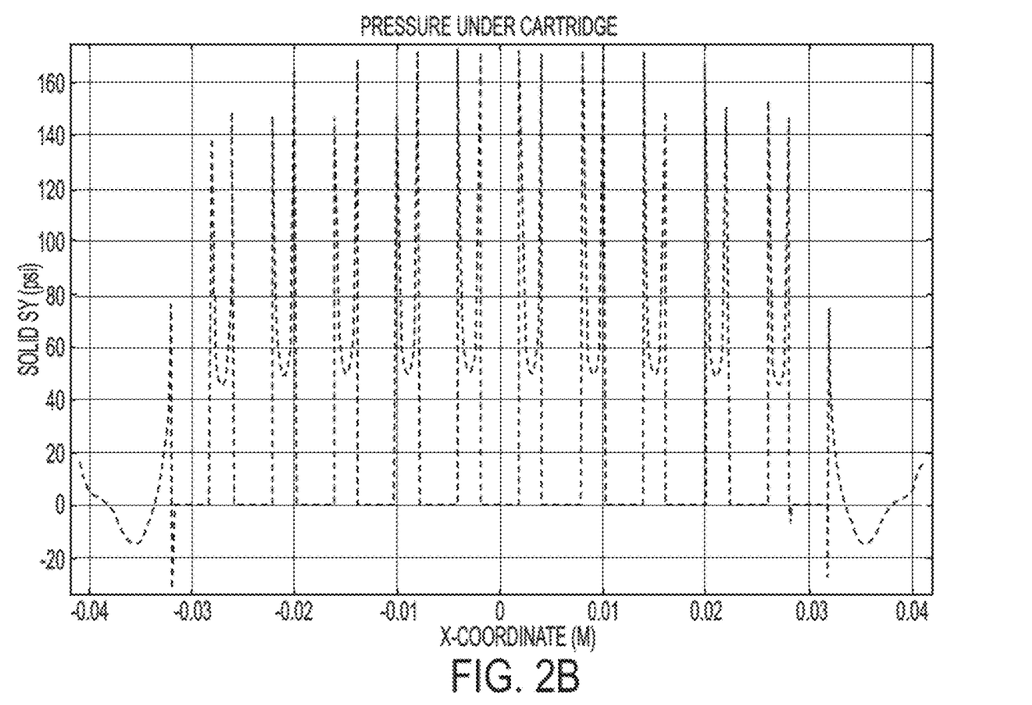
FIG. 2B is a graphical representation of pressure under the cartridge of FIG. 2A.

FIG. 2B graphically illustrates the pressure under a cartridge, across the width thereof, with a bladder-based cartridge securing system according to some embodiments. Specifically, FIG. 2B simulates a cartridge with a number of flow channels that are separated by narrow walls. The pressure changes from zero directly underneath the flow channel (as expected, due to lack of direct contact) and peaks along the edges of the walls and goes down to a highly repeatable value at the center of each wall.

In some embodiments, the bladder membrane may be on the order of a millimeter or less in thickness, for example, between about 250 microns to about 1 mm. The inflated bladder may not need to provide a large separation distance from the lid to the cartridge. The deflated gap between the bladder and the cartridge's top surface may be less than several millimeters. In such embodiments, a minimum dimension of the bladder may be at least an order of magnitude larger than the deflated gap to the cartridge. Thus, in such embodiments, the maximum strain on the membrane when inflated may not exceed 1-5% (for example). Limiting the maximum strain on the membrane in some embodiments enables reliable operation over a long lifetime for the bladder.

Figure 3A:
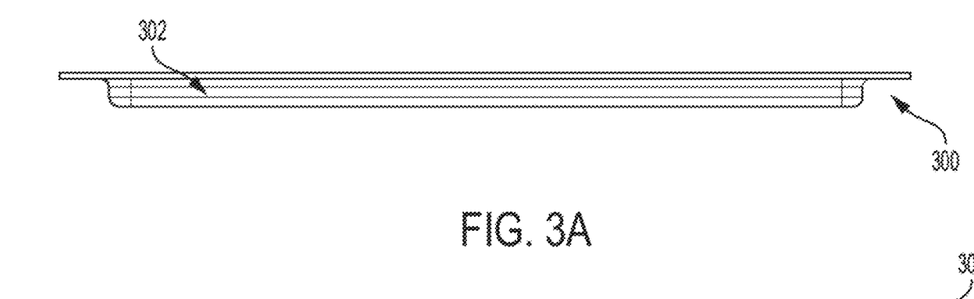
FIG. 3A is a side view of an exemplary bladder membrane for a cartridge securing system according to some embodiments.
Figure 3B:
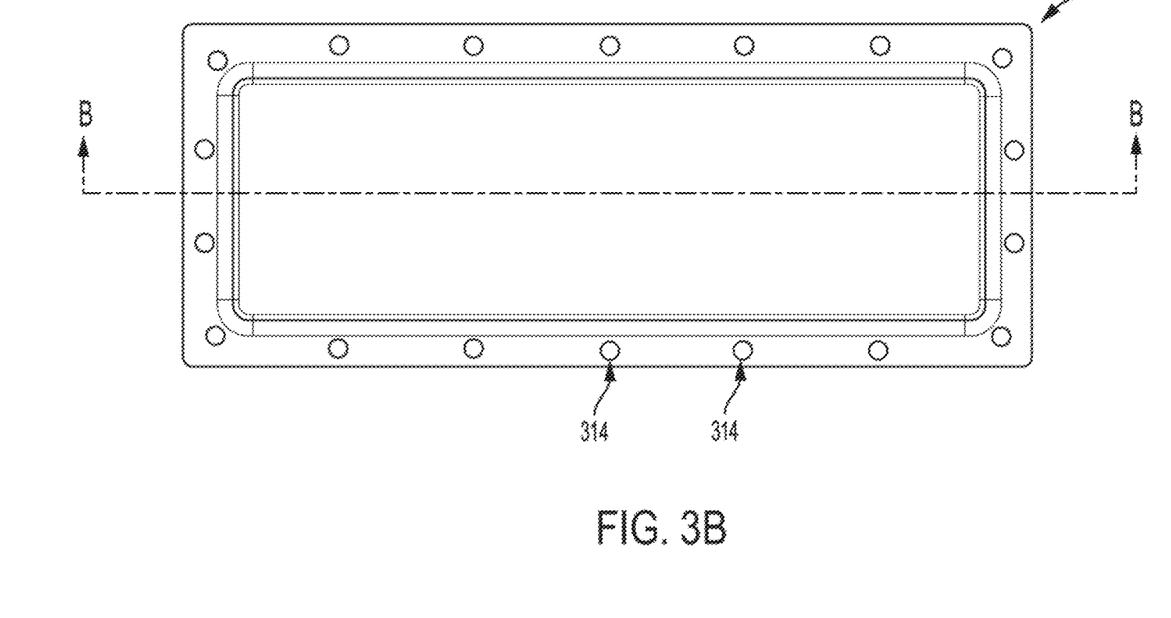
FIG. 3B is a top view of the exemplary bladder membrane of FIG. 3A.
Figure 3C:
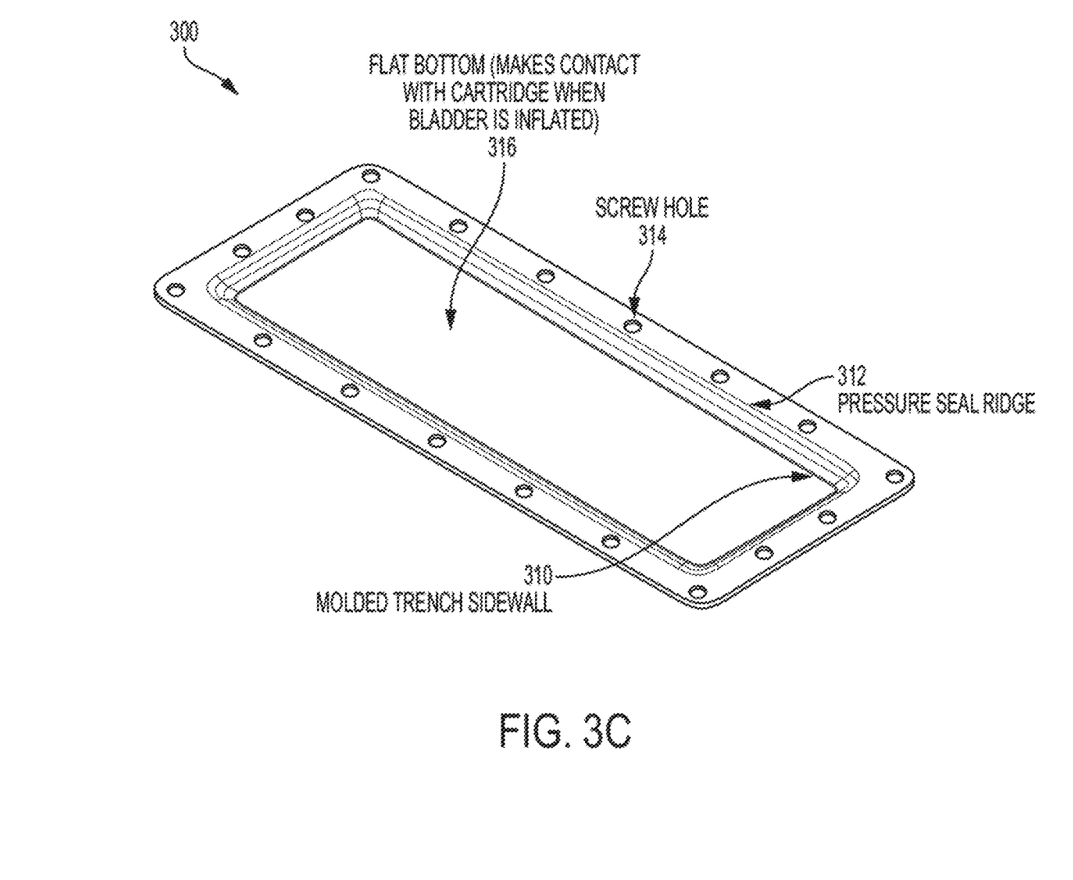
FIG. 3C is a perspective view of the exemplary bladder membrane of FIG. 3A.

FIG. 3A is a side view of an exemplary bladder membrane for use with cartridge securement applications according to some embodiments of the disclosure. FIG. 3B is a top view illustration of the exemplary bladder of FIG. 3A, where FIG. 3A is the view from axis line B-B. FIG. 3C is a perspective view of the exemplary bladder membrane of FIG. 3A. Referring to FIGS. 3A-3C, bladder 300 is illustrated with a bladder membrane 302 that may be injection-molded to incorporate shapes, including three dimensional features, such as screw holes 314 to accommodate easy mounting to a bladder lid frame, a seal ridge 312 configured for helping the bladder hold pressure when screwed onto a holding frame, and a central trench 316 with a depth comparable to the thickness of the holding frame. The holding frame is generally configured to support the bladder membrane from below the screw holes, fastening it to the remainder of the lid support structure. The central trench may limit the amount of membrane stretching during inflation, by placing the bottom surface of the membrane closer to the cartridge.

In some embodiments, the main component of the membrane may be a flat, thin section that conformally expands over the top surface of the cartridge as shown FIGS. 3A-3C. Molding can enable the incorporation of arbitrary shapes within different regions of the bladder membrane, and such variations in features, shape or local membrane thickness may be utilized to create a mom robust implementation of the inflatable bladder lid. For example, membrane 300 of FIG. 3C may incorporate screw holes near its outer edges to assist in its mounting within its frame, as well as a pressure sealing ridge and a three-dimensional contour for better inflation performance within its housing. A molded trench sidewall 310 may also be added. The membrane's central section that makes contact with the cartridge may be flat and featureless or may contain certain features that mate with corresponding ones on the top side of the cartridge.

Figure 4A:
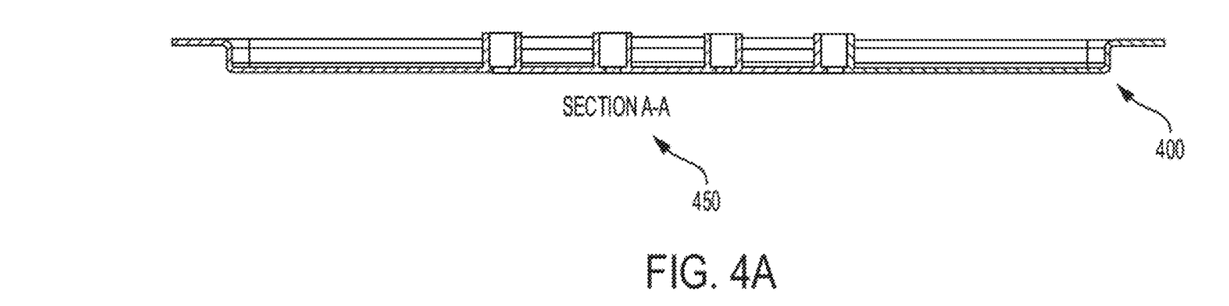
FIG. 4A is a side view of an inflatable bladder with mating features according to some embodiments of the present disclosure.
Figure 4B:
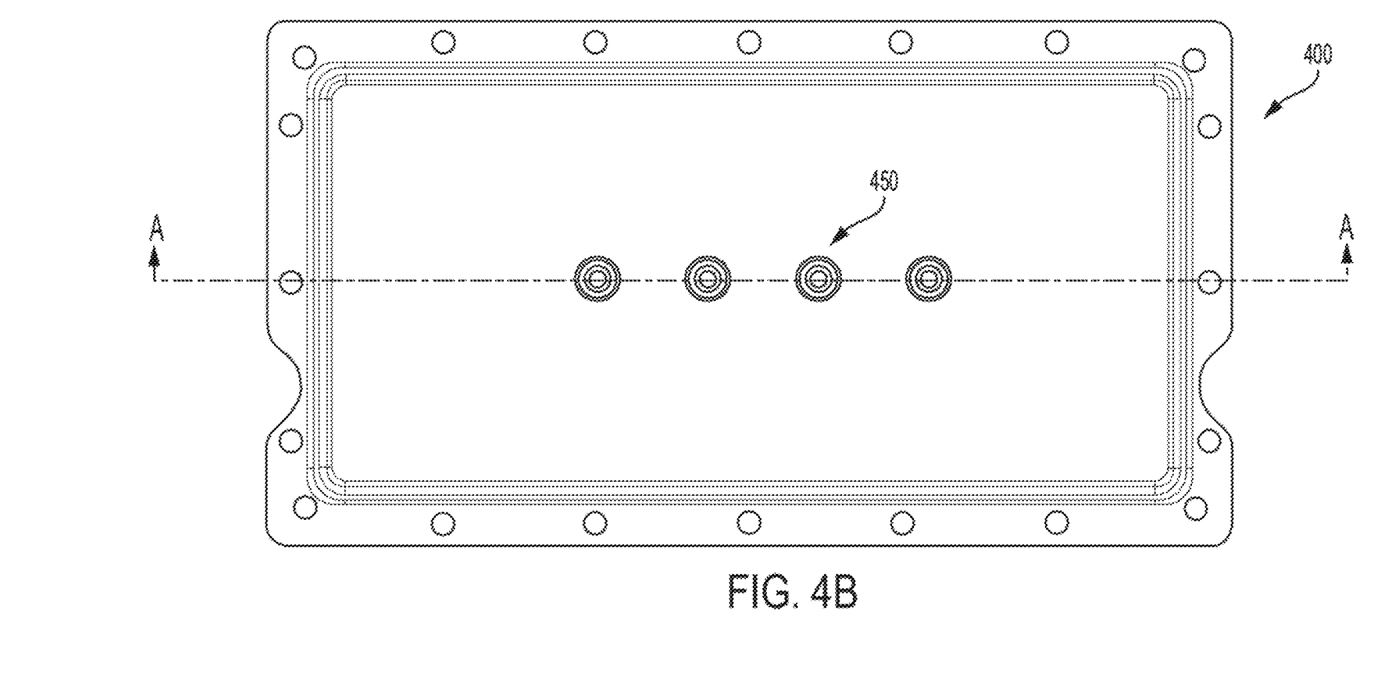
FIG. 4B is a top view of the exemplary bladder of FIG. 4A.
Figure 4C:
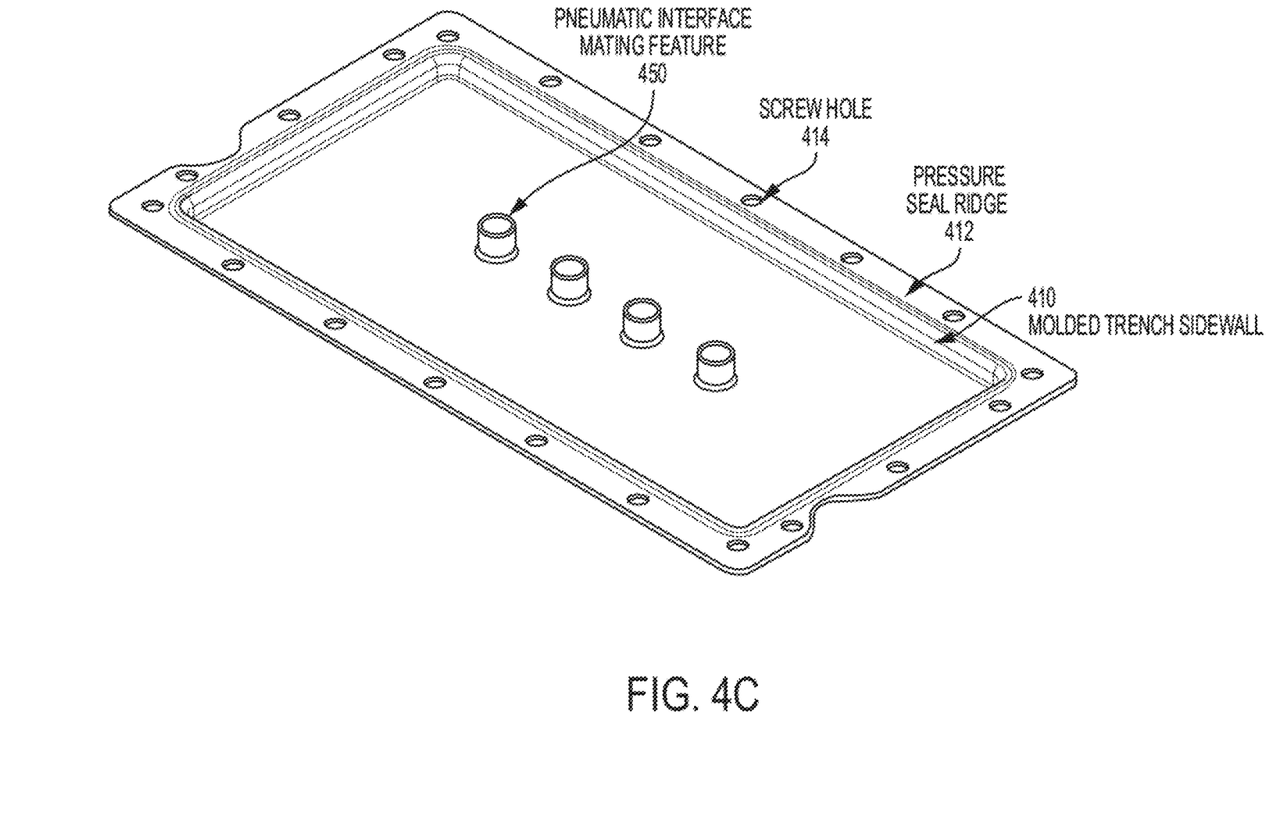
FIG. 4C is a perspective view of the inflatable bladder of FIG. 4A.

FIG. 4A is a side view of an inflatable bladder with mating features according to some embodiments, FIG. 4B is a top view of the exemplary bladder of FIG. 4A, where FIG. 4A is the view from axis line A-A, and FIG. 4C is a perspective view of the inflatable bladder of FIG. 4A. In FIGS. 4A-4C, the membrane may incorporate pneumatic mating features 450. The pneumatic features 450 may be configured so as to interface with pneumatic pressure and vacuum lines (not shown) that connect to pneumatic ports on the top surface of a cartridge (not shown). The mating features may include pneumatic line connections that carry pressure and vacuum pulses through tubings that traverse the inner volume of the bladder onto the pneumatic ports over the top surface of the cartridge. In such embodiments, the tubing connections within the bladder volume may be flexible, accommodating the limited expansion of the bladder without significant strain on the tubings or the bladder membrane. FIGS. 4A-4C also show screw holes 414, pressure seal ridge 412 and molded trench sidewall 410 (see also molded trench sidewall 310. FIG. 3).

When pneumatic pressure lines interface with the cartridge through the bladder, sealing around the pneumatic lines between the cartridge and the bladder outer surface may be required. This may be achieved by setting the bladder inflation pressure higher than the pneumatic pressure pulse amplitude. In this fashion, the bladder membrane is configured to act as a flat seal around the pneumatic lines at the interface with the cartridge. An alternative approach, according to some embodiments, may be to add sealing features (e.g., ridges that act as half O-rings) around each pneumatic mating hole on the bladder's outer surface (e.g., similar to the sealing ridge depicted in FIGS. 3 and 4) so as to create a deliberate pressure concentration around the interface. Thus, bladder pressure may be the same or lower than the pressure pulse amplitudes on the pneumatic lines, and a reliable seal may still be obtained at the pneumatic interface locations.

Figure 5A:
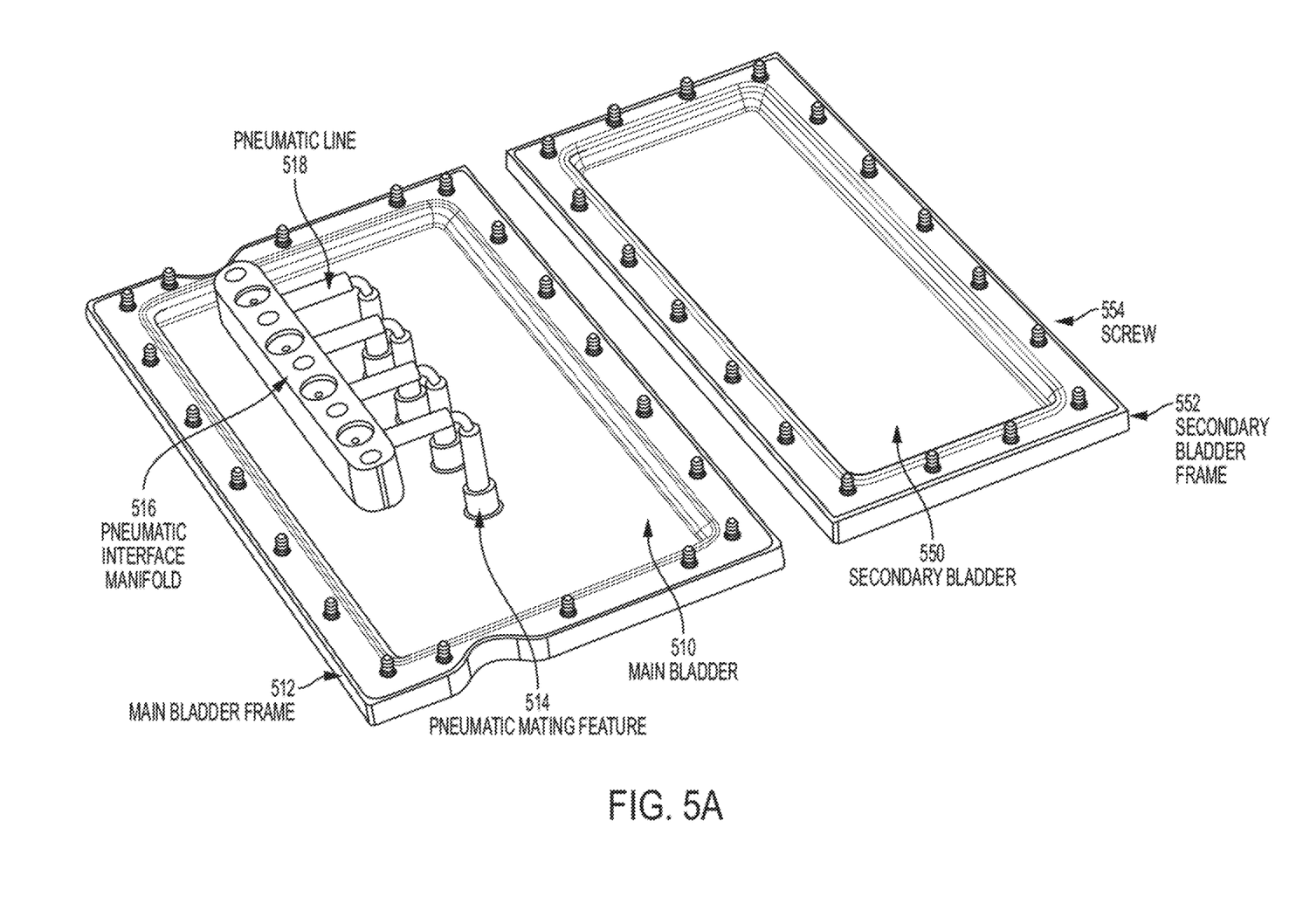
FIG. 5A is a plain bladder used with pneumatic mating features according to some embodiments of the disclosure.

FIG. 5A illustrates a plain bladder used in connection with pneumatic mating features to form a combination lid for cartridge clamping according to some embodiments of the disclosure. Specifically, FIG. 5A shows main bladder 510 and secondary bladder 550. Main bladder 510 includes main bladder frame 512, pneumatic mating features 514, pneumatic interface manifold 516, and pneumatic lines 518. Secondary bladder 550 includes secondary bladder frame 552 and screws 554. In an exemplary application, the inflatable bladder disclosed herein may be used in conjunction with an assay cartridge and an assembly which is further described below.

Bladders 510 and 550 may be positioned to apply pressure on different locations on the cartridge surface (not shown). The two bladders 510, 550 can be inflated simultaneously or at different times during the assay. The bladders may be pressurized using the same pressure source or they may be independently actuated to different pressures with the same or different pressure sources. In one embodiment of the disclosure, the secondary bladder may then have its own pneumatic lines, pneumatic interface manifold, and/or pneumatic mating features. The pneumatic interface manifold 516 may optionally connect to the lid superstructure to relay the pneumatic control pressure/vacuum pulses onto corresponding pneumatic ports atop the cartridge. While not shown, a pressure source (e.g., pressurized tank or a pneumatic pump) may communicate pressure to manifold 516 from an external source.

Since the bladder material is elastic, it is possible to have features on the bladder membrane move away from each other once the bladder expands over the cartridge surface. To avoid problems associated with such movement (e.g., if features on the bladder membrane need to mate with features on the cartridge), in some embodiments, the membrane between and/or in the immediate vicinity of the mating features may be molded thicker than the remainder of the bladder membrane—effectively rendering it non-stretchable when the bladder is inflated. Alternatively, in some embodiments, the locations of the mating features could be designed to compensate for bladder stretching, so that they move to correct locations once the bladder is inflated.

Figure 5B:
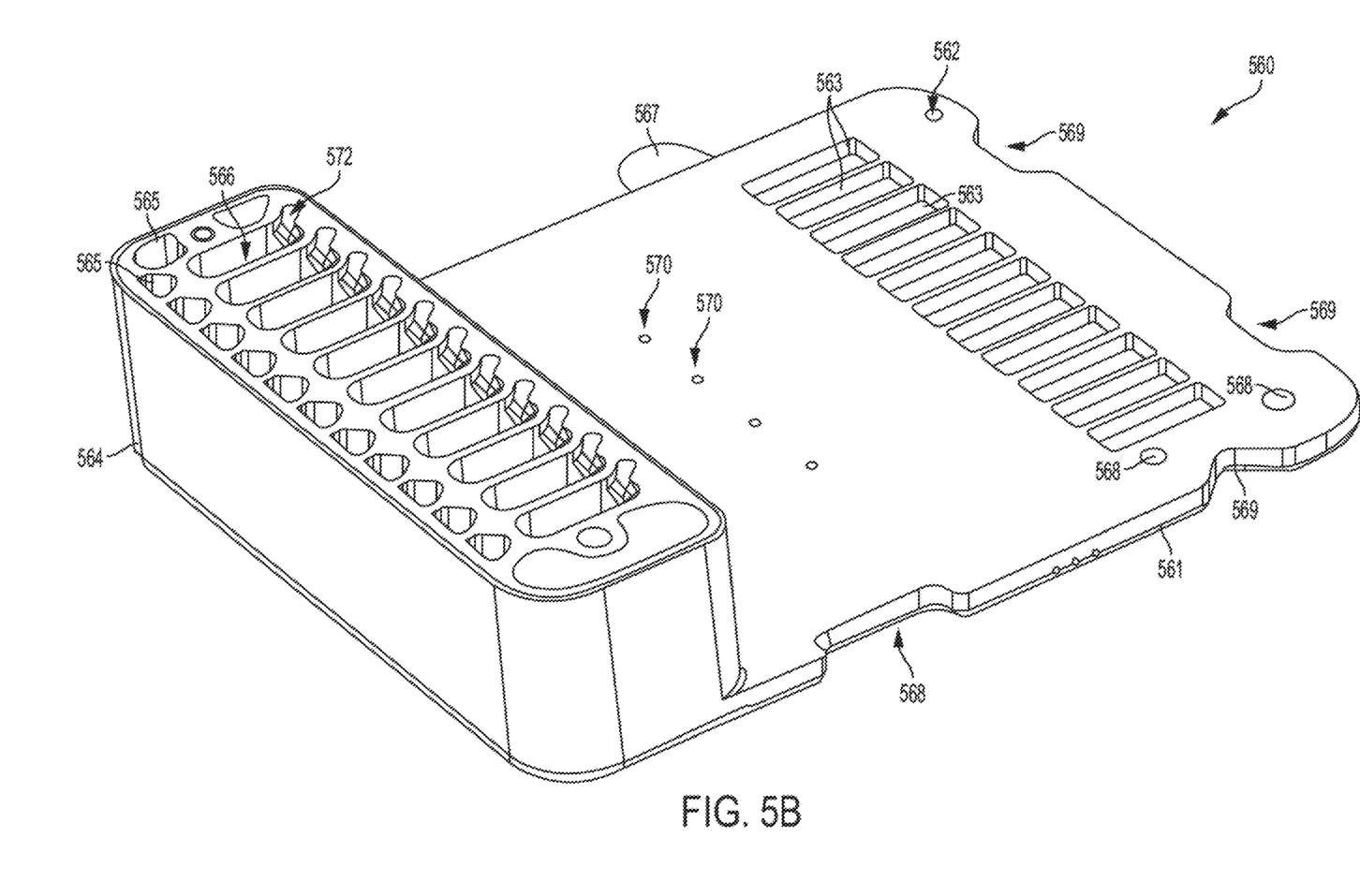
FIG. 5B is a perspective depiction of an exemplary cartridge according to some embodiments of the disclosure.

FIG. 5B is a perspective depiction of an exemplary cartridge. Specifically. FIG. 5B is a perspective depiction of an exemplary embodiment of a cartridge that may perform up to eleven independent, parallel assays. Other embodiments of a cartridge may be configured to perform a different number of parallel assays (such as eight or twelve), or they may be configured to run a single assay. The width of the cartridge 560 may change depending on the total number of assays supported.

Cartridge 560 may comprise multiple layers integrated into a unitary or an integrated cartridge. In an alternative embodiment, cartridge 560 may comprise a single construction with various features discussed below integrated therein. Cartridge 560 may include base layer 561, cartridge-instrument alignment features 569, a reagent spotting mask 567, pump valves 570 and a reservoir stack 564. Reservoir stack 564 may further include main reservoirs 566, return chimneys 572 and a plurality of secondary (and, in some embodiments, tertiary, etc.) reservoirs 565. The cartridge may also comprise internal alignment features 562 and 568 that may be used to ensure proper registration between the internal layers during its construction.

Cartridge-instrument alignment features enable aligning placement of cartridge 560 within an assay instrument (not shown). The alignment may be necessary to ensure, in part, that the cartridge main channels can align directly (or approximately) over the electrodes of the excitation PCB. This may also ensure that any other interface to the cartridge (such as pneumatic input ports for pumping fluid reagents within the cartridge) could be aligned with the corresponding output from the instrument. The alignment may also aid with aligning the inflatable bladder. Cartridge 560 may be inserted into an instrument slot or may be placed at a designated space (such as a dedicated receptacle) within the assay instrument.

A plurality of cartridge analysis windows (or viewing ports) 563 may correspond with each of a plurality of reaction channels (not shown). As described below, the reaction channels (not shown) may be embedded or formed over base 561. Cartridge analysis windows 563 provide optical viewing ports to each of the reaction channels.

The reagent spotting mask 567 may optionally be added to accommodate, for example, the precise positioning and spotting of assay reagents (e.g., capture reagents such as antibodies, aptamers, DNA fragments, other proteins or molecules used for surface modification or detection, etc.). The mask may consist of a matrix of patterned openings over an adhesive or a soft gasket (e.g., silicone rubber, PDMS, etc.) that is temporarily affixed over one of the bounding surfaces of the main assay channels. The assay reagents may thus be coated (or spotted) over that surface of the cartridge through the mask openings, either during the assembly of the cartridge or prior to running the assay by the end-user. Following an optional incubation period, the coated (or spotted) windows might be washed and/or dried, and the reagent spotting mask 567 may be removed (e.g., peeled off the cartridge surface) prior to capping the main assay channels with the final capping layer of the multi-stack assembly.

The internal alignment features 562 and 568 may optionally be used to assist in the assembly of the cartridge internal layers, in order to ensure that each layer is properly aligned with and registered to its neighbors within a given positional tolerance. In some embodiments, the alignment features may be holes of a given shape (e.g., circular, square, hexagonal, diamond, etc.) that mate with alignment posts on an alignment jig.

In some embodiments, the cartridge may have pneumatic input ports 570. These ports may lead into pneumatic lines integrated into the cartridge. Together, they relay pressure and/or vacuum signals from the instrument to membrane valves (not shown) integrated into the body of the cartridge.

Reservoir stack 564, as described below, can retain the cartridge input fluids. For example, the reservoir stack 564 may receive and retain assay reagents which are then directed to the fluidic network (not shown) of cartridge 560. The fluid network (interchangeably, fluidic channels) may span between the reservoir stack 564 and viewing ports (windows) 563. Main reservoirs 566 typically receive ferrofluid and/or input sample reagents that are intended for the ferrofluidic assay. They may also be configured to receive additional reagents, as needed. Once an exemplary bladder is engaged with cartridge 560, the bladder may pressurize the fluidic channels (not shown) at a substantially uniform pressure.

In some embodiments, reservoir stack 564 may support more than one set of reservoir wells per independent assay. Secondary reservoirs 565 may be configured to receive secondary reagents used for an assay under study. The secondary reagents may include labels, dyes, secondary antibodies. PCR reagents required for DNA amplification after cell capture, etc. In some implementations, the secondary reservoirs may be left blank or empty.

In some embodiments, assay cartridge 560 may include multiple, patterned, alternating layers of double-sided adhesive tapes and plain plastic film that are laminated to each other in a specific sequence. In an exemplary multi-layered cartridge, each layer may be independently patterned by a subtractive process (such as laser or die cutting, etc.) and subsequently laminated to its neighbors through either a manual and/or automated lamination procedure. When pressure-sensitive adhesive (PSA) layers are used, the lamination process may involve a roll-laminator or a hydraulic linear press. Other types of adhesives (such as heat-activated or UV-activated) may also be used, depending on compatibility with the assay. In some embodiments, neighboring layers are bonded using thermal compression or solvent-based bonding techniques in place of using adhesives.

Figure 6:
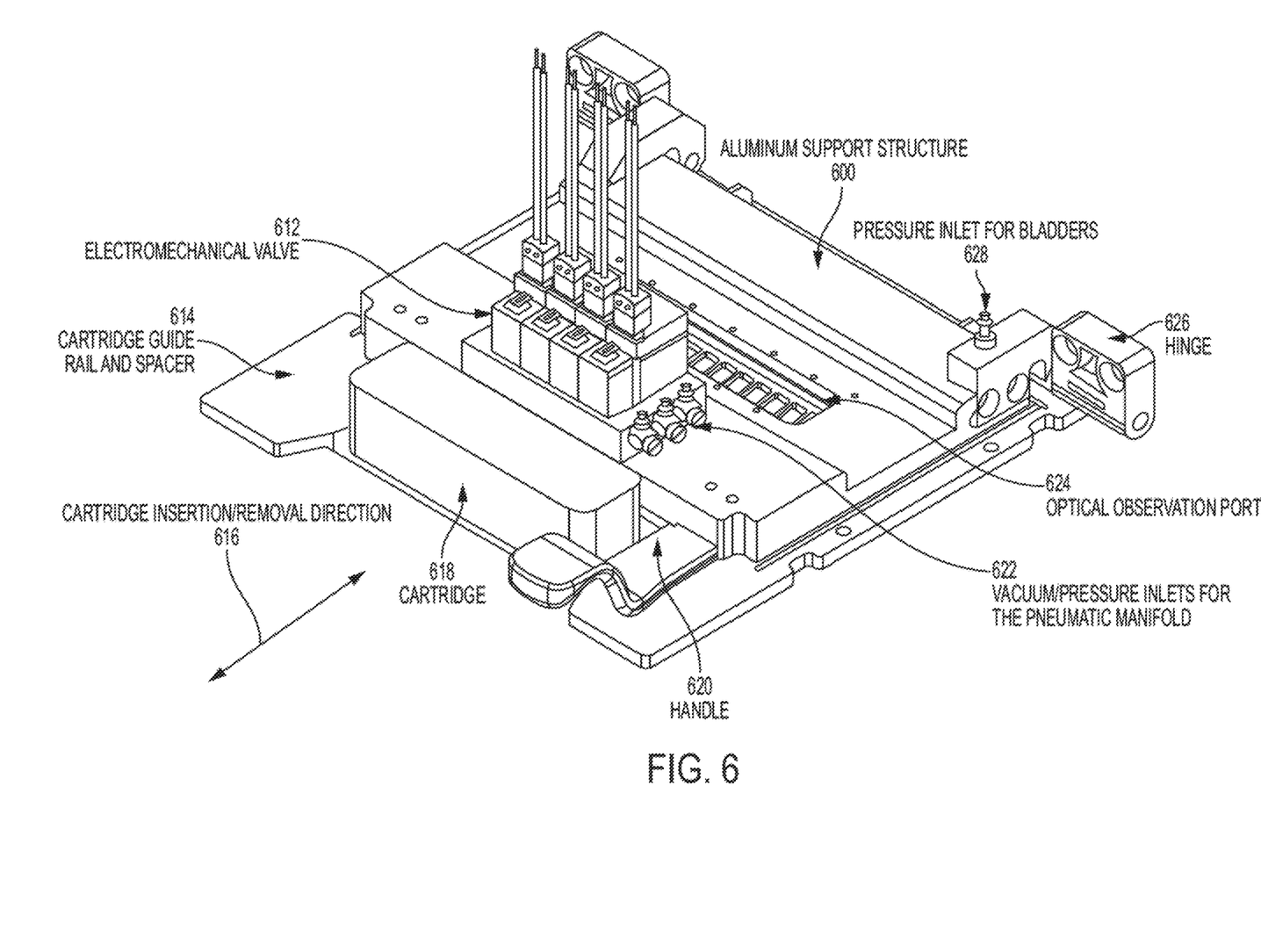
FIG. 6 is an exemplary bladder lid according to some embodiments of the disclosure.

FIG. 6 illustrates a support structure (interchangeably, bladder lid or lid) according to some embodiments of the disclosure. Lid 600 of FIG. 6 is shown with electromechanical valve 612, cartridge guide rail and spacer 614, cartridge 618, handle 620, vacuum/pressure inlets for the pneumatic manifold 622, optical observation port 624, hinge 626, and pressure inlet for bladders 628. In FIG. 6, the main and the secondary bladders of FIG. 5A rest under the aluminum support structure 600.

The spacing between the two bladders (not shown) may be used for optical access to assay windows of the disposable cartridge (e.g., using optical observation port 624). The cartridge 618 is inserted and removed along the direction shown by arrow 616. Electromechanical valves 612 on top of the pneumatic interface manifold 622 control the pneumatic signals and their timing. Independent of the pneumatics, the bladder pressures may be controlled via a diaphragm air pump (not shown) and dedicated pressure regulator (not shown). In some embodiments, the support structure of lid 600 may also pivot around hinges 626 at the back and open as a door for easier access to bladders during maintenance, repair and cleaning operations.

Figure 7:
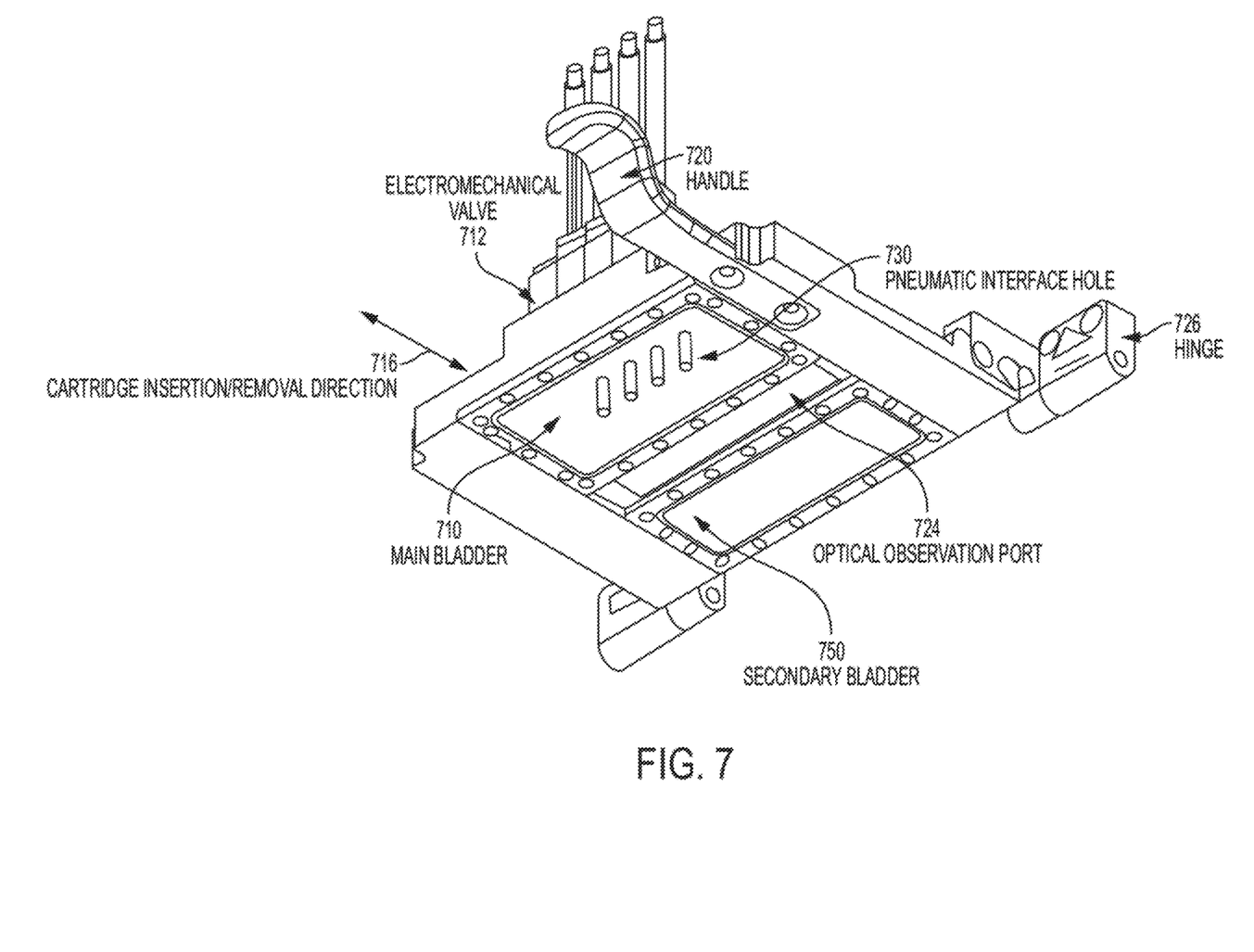
FIG. 7 is a perspective view of the bladder lid of FIG. 6 shown from below.

FIG. 7 is a perspective view of the bladder lid of FIG. 6 from below. In FIG. 7, the cartridge and its guide have been omitted for clarity. FIG. 7 shows electromechanical valves 712, main bladder 710, secondary bladder 750, optical observation port 724, hinge 726, pneumatic interface holes 730, and handle 720. The cartridge insertion/removal direction is shown by arrow 716. The main bladder 710 and the secondary bladder 750 of FIG. 7 may comport to the main bladder 510 and secondary bladder 550 of FIG. 5A. Similarly, pneumatic lines 518 of FIG. 5A may communicate pneumatic pressure to the main bladder through pneumatic interface hole 730 shown in FIG. 7.

FIG. 7 may further include circuitry/hardware and software to control actuation of the electromechanical valve assembly 712. The hardware may include integrated circuit (IC) or chipset(s) as needed to actuate one or more of the electromechanically valves. The circuitry may further include one or more processors and operation interface configured to receive instructions from operator to pressurize one or more of bladders 710 and 750 in accordance with predefined parameters. In this manner, the bladders may be pressurized independently of each other or in concert. Further, the controller may pressurize each bladder uniformly or non-uniformly. That is, the controller may actuate electromechanical valves such that a region of the bladder can be pressurized relative to other regions of the bladder.

The inflatable bladder lid offers many advantages over a mechanical clamp/lid. One advantage is the generation of a uniform pressure over the cartridge. Multiple bladders may be utilized to cover specific regions of the cartridge surface. Each bladder can be set independently to different pressures, depending on the needs of the application, to pressurize a respective region of the cartridge and to thereby control reagent movement. The bladder is also compact in shape and form. The uniformity in clamping pressure can be achieved in a surface area that is only slightly larger than the area of the cartridge itself. Further, the bladder requires no more than a quarter inch-thick aluminum plate (or a steel plate that is a third of that thickness) as its mechanical support. Hence, the total size (both volume and mass) of the bladder system is a very small fraction of what would be necessary if a mechanical door/clamp were to be used with similar performance requirements in pressure uniformity and repeatability.

The operating pressure of the inflatable bladder lid can be easily tuned (via a small pressure regulator incorporated into the instrument), which can increase the application potential of a given bladder design.

The bladder lid enables a cartridge interface for its instrument. In a traditional instrument interface, a mechanical door needs to open and close for each cartridge insertion and removal. With the bladder lid, the cartridge may be simply slid in and out of a narrow slot on the instrument (e.g., FIGS. 6-7). No moving parts (besides the inflating bladder membrane) on the instrument means design simplicity, lowered design and manufacturing costs, longer instrument lifetime, increased operational reliability and lowered maintenance requirements for the instrument.

When the bladder is inflated to a moderate pressure (e.g., ~20 psi above ambient pressure), a bladder that makes contact over any appreciable surface area of the cartridge will apply a strong enough clamping force on the cartridge to prevent its accidental dislocation or pull-out before the assay is finished. For instance, if the total contact area is 5 square inches, the total clamping force on the cartridge will be about 100 pounds (for about 20 psi of bladder pressure). This is another feature that makes an instrument door redundant—thereby simplifying the instrument design and its physical user interface.

The following non-limiting examples am provided to illustrate exemplary embodiment of the disclosure. Example 1 relates to an inflatable bladder to seal an external cartridge to an assay device, comprising: a membrane; a frame to receive the membrane, the frame further comprising a pressure seal ridge having a plurality of securing slots therein; and a molded trench sidewall to accommodate an elastic membrane.

Example 2 relates to the inflatable bladder lid of example 1, wherein the securing slots further comprise screw holes.

Example 3 relates to the inflatable bladder lid of example 1, further comprising at least one pneumatic interface to communicate pneumatic pressure from an external pressure or vacuum source to the bladder.

Example 4 relates to the inflatable bladder lid of example 1, wherein the bladder system is configured to provide a substantially constant pressure across an assay cartridge surface.

Example 5 relates to the inflatable bladder lid of example 1, wherein the bladder lid is used in combination with a microfluidic system.

Example 6 is directed to an assay system comprising: a cartridge configured to receive one or more reagents for testing an assay to detect presence of one or more bacteria or chemical; a lid assembly configured to interface the cartridge and to pressurize the cartridge; wherein the lid assembly further comprises one or more compartments to receive one or more inflatable bladders, each inflatable bladder engaging a flow channel compartment in the cartridge.

Example 7 is directed to the assay system of example 6, wherein each flow channel compartment comprises one or more pneumatic features to communicate one of pressure or vacuum to the one or more inflatable bladders to thereby exert pneumatic pressure to the flow channel.

Example 8 is directed to the assay system of example 6, wherein the lid assembly further comprises a port for to receive the cartridge.

Example 9 is directed to the assay system of example 6, further comprising a controller circuitry and a pneumatic source.

Example 10 is directed to the assay system of example 6, wherein the controller circuitry engages the pneumatic source to inflate the lid to thereby pressurize the cartridge.

Example 11 is directed to the assay system of example 10, wherein the controller circuitry engages the pneumatic source to selectively pressurize one or more flow channel compartment in the cartridge.

Example 12 is directed to the assay system of example 11, wherein the controller circuitry engages the pneumatic source to selectively pressurize one or more flow channel compartment in the cartridge to at least two different pressures.

Example 13 is directed to the assay system of example 6, wherein the lid assembly further comprises an electromechanical valve assembly for controlling pneumatic pressure to the inflatable bladders.

Example 14 is directed to the assay system of example 13, further comprising a controller including hardware and software for controlling electromechanical valves to pressurize one or more region of a bladder independently of other regions.

Example 15 is directed to a microfluidic assembly, comprising: a cartridge having one or more fluidic channels, a fluidic input and a fluidic output, the cartridge configured to receive one or more assays; an inflatable bladder to couple to the cartridge, the inflatable bladed configured to receive an input to inflate the bladder; a support structure to receive one or more of the cartridge and the inflatable bladder; and a controller to regulate the input to the bladder to pressurize the inflatable bladder and thereby exert pressure from a portion of the inflatable bladder to a corresponding portion of the cartridge.

Example 16 is directed to the assembly of example 15, wherein the portion of the inflatable bladder pressurizes one or more of the fluidic channels.

Example 17 is directed to the assembly of example 15, wherein the inflatable bladder further comprises a membrane; a frame to receive the membrane, the frame further comprising a pressure seal ridge having a plurality of securing slots therein; and a molded trench sidewall to accommodate an elastic membrane.

Example 18 is directed to the assembly of example 16, wherein the securing slots further comprise screw holes.

Example 19 is directed to the assembly of example 15, further comprising at least one pneumatic interface to communicate pneumatic pressure from the support structure to the inflatable bladder.

Example 20 is directed to the assembly of example 16, wherein the pressure comprises vacuum.

Example 21 is directed to the assembly of example 16, wherein the inflatable bladder lid is configured to slide into the support structure.

Example 22 is directed to the assembly of example 16, wherein the controller is configured to regulate the input to the bladder to pressurize a first region of the inflatable bladder to a first pressure and to pressurize a second region of the inflatable bladder to a second pressure.

Example 23 is directed to the assembly of example 22, wherein the first region of the inflatable bladder corresponds to a first fluidic channel and wherein the second region of the inflatable bladder corresponds to a second fluidic channel.

Exemplary embodiments of the devices, systems and methods have been described herein. The disclosed inflatable bladder lids may be used with various microfluidic systems and circuits to provide substantially uniform pressure across a surface.

As noted, these embodiments have been described for illustrative purposes only and am not limiting. Other embodiments am possible and are covered by the disclosure, which will be apparent from the teachings contained herein. Thus, the breadth and scope of the disclosure should not be limited by any of the above-described embodiments but should be defined only in accordance with claims supported by the present disclosure and their equivalents. Moreover, embodiments of the subject disclosure may include methods, systems and devices which may further include any and all elements from any other disclosed methods, systems, and devices, including any and all elements corresponding cartridge securement in a device/system. In other words, elements from one or another disclosed embodiment(s) may be interchangeable with elements from other disclosed embodiments. In addition, one or more features/elements of disclosed embodiments may be removed and still result in patentable subject matter (and thus, resulting in yet more embodiments of the subject disclosure). Correspondingly, some embodiments of the present disclosure may be patentably distinct from one and/or another reference by specifically lacking one or more elements/features. In other words, claims to certain embodiments may contain negative limitation to specifically exclude one or more elements/features resulting in embodiments which are patentably distinct from the prior art which include such features/elements.

What is claimed is:

1. An inflatable bladder to seal an external cartridge to an assay device, comprising:
   a membrane;
   a frame to receive the membrane, the, frame further comprising a pressure seal ridge having a plurality of securing slots therein; and
   a molded trench sidewall to accommodate an elastic membrane.

2. The inflatable bladder of claim 1, wherein the securing slots further comprise screw holes.

3. The inflatable bladder of claim 1, further comprising at least one pneumatic interface to communicate pneumatic pressure from an external pressure or vacuum source to the bladder.

4. The inflatable bladder of claim 1, wherein the inflatable bladder is configured to provide a substantially constant pressure across an assay cartridge surface.

5. The inflatable bladder of claim 1, wherein the inflatable bladder is used in combination with a microfluidic system.

6. A microfluidic assembly, comprising;
   a cartridge having one or more fluidic channels, a fluidic input and a fluidic output, the cartridge configured to receive one or more assays;
   an inflatable bladder to couple to the cartridge, the inflatable bladder configured to receive an input to inflate the bladder;
   a support structure to receive one or more of the cartridge and the inflatable bladder; and
   a controller to regulate the input to the bladder to pressurize the inflatable bladder and thereby exert pressure from a portion of the inflatable bladder to a corresponding portion of the cartridge,
   wherein:
      the inflatable bladder further comprises a membrane and a frame to receive the membrane,
      the frame includes a pressure seal ridge having a plurality of securing slots therein, and a molded trench sidewall to accommodate an elastic membrane.

7. The assembly of claim 6, wherein the portion of the inflatable bladder pressurizes one or more of the fluidic channels.

8. The assembly of claim 7, wherein the pressure composes vacuum.

9. The assembly of claim 7, wherein the controller is configured to regulate the input to the bladder to pressurize a first region of the inflatable bladder to a first pressure and to pressurize a second region of the inflatable bladder to a second pressure.

10. The assembly of claim 9, wherein the first region of the inflatable bladder corresponds to a first fluidic channel and wherein the second region of the inflatable bladder corresponds to a second fluidic channel.

11. The assembly of claim 6, wherein the securing slots further comprise screw holes.

12. The assembly of claim 6, further comprising at least one pneumatic interface to communicate pneumatic pressure from the support structure to the inflatable bladder.

13. A microfluidic assembly, comprising;
   a cartridge having one or more fluidic channels, a fluidic input and a fluidic output, the cartridge configured to receive one or more assays;
   an inflatable bladder to couple to the cartridge, the inflatable bladder configured to receive an input to inflate the bladder;
   a support structure to receive one or more of the cartridge and the inflatable bladder; and
   a controller to regulate the input to the bladder to pressurize the inflatable bladder and thereby exert pressure from a portion of the inflatable bladder to a corresponding portion of the cartridge,
   wherein:
      the portion of the inflatable bladder pressurizes one or more of the fluidic channels,
      and
      the assembly further comprises an inflatable bladder lid configured to slide into the support structure.

14. The assembly of claim 13, wherein the portion of the inflatable bladder pressurizes one or more of the fluidic channels.

15. The assembly of claim 14, wherein the pressure composes vacuum.

16. The assembly of claim 14, wherein the controller is configured to regulate the input to the bladder to pressurize a first region of the inflatable bladder to a first pressure and to pressurize a second region of the inflatable bladder to a second pressure.

17. The assembly of claim 16, wherein the first region of the inflatable bladder corresponds to a first fluidic channel and wherein the second region of the inflatable bladder corresponds to a second fluidic channel.

18. The assembly of claim 13, wherein:
    the inflatable bladder further comprises a membrane and a frame to receive the membrane, and
    the frame further comprising a pressure seal ridge having a plurality of securing slots therein, and a molded trench sidewall to accommodate an elastic membrane.

19. The assembly of claim 13, wherein the securing slots further comprise screw holes.

20. The assembly of claim 13, further comprising at least one pneumatic interface to communicate pneumatic pressure from the support structure to the inflatable bladder.

\* \* \* \* \*